Feb. 10, 1970       R. B. FANNIN       3,494,552
ORCHARD HEATING SYSTEM
Filed April 3, 1968
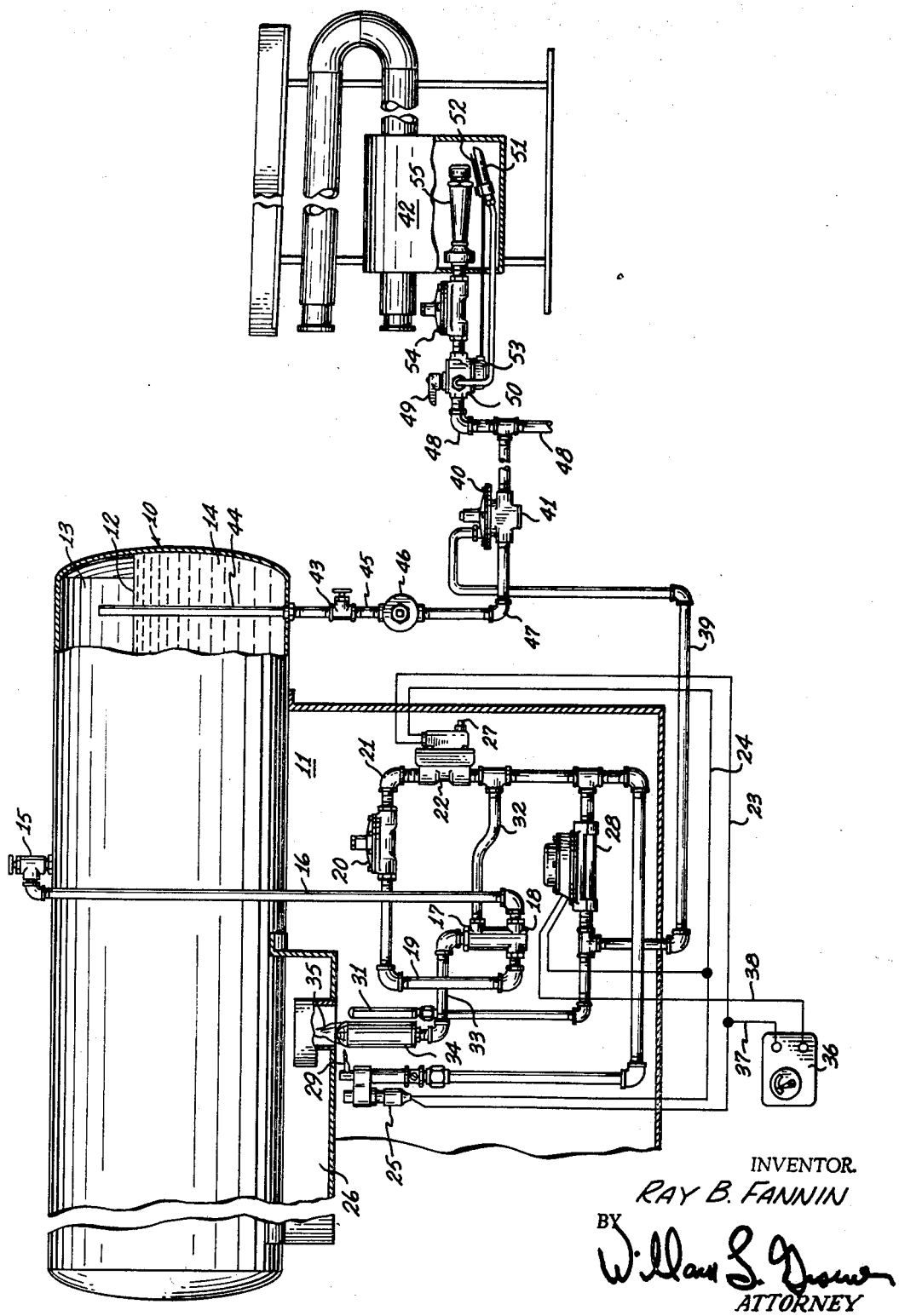
INVENTOR.
RAY B. FANNIN
BY
William S. Drower
ATTORNEY

United States Patent Office 3,494,552
Patented Feb. 10, 1970

3,494,552
ORCHARD HEATING SYSTEM
Ray B. Fannin, 226 E. McKinley St.,
Tempe, Ariz. 85281
Filed Apr. 3, 1968, Ser. No. 718,457
Int. Cl. G05d 23/00
U.S. Cl. 237—2                                    3 Claims

ABSTRACT OF THE DISCLOSURE

A gas fired orchard heating system in which a plurality of heating stoves at a series of remote locations in the orchard and supplied with fuel and thermostatically controlled from a single master control and fuel supply station solely by means of a single dual pressure supply line between the heating stoves and the master control and fuel supply station.

BACKGROUND OF THE INVENTION

The field of this invention lies in heating systems and is particularly directed to a gas fired remotely controlled orchard heating system.

The chief difficulty in prior devices for orchard heating is the problem in individually servicing the heating or smudge pots at a plurality of locations in the orchard together with the lack of thermostatic control from the ambient air temperature in the orchard. As a result, automatic turn on as dangerous low temperatures develop could not be satisfactorily accomplished. As a result, excessive fuel was used often during long periods when actually no heat was required.

Further, when remoted automatic control was attempted from a common location for a plurality of widely spaced heaters throughout the orchard, the problem of electric control circuitry to each of the heaters or stoves in addition to the gas supply lines presented a formidable problem in installation and interference with the normal maintenance and cultivation of the orchard and the high cost of the electric wiring system.

SUMMARY OF THE INVENTION

One of the objects of this invention is to provide a gas fired automatic orchard heating system operable from a remote control and fuel supply station.

Still another object is to provide a gas fired automatic orchard heating system having a remote control and fuel supply station and a plurality of spaced heaters arranged throughout the orchard which are interconnected by a single dual pressure gas supply line system providing the sole means for automatically controlling the fuel supply to all of the spaced heaters from the ambient air temperature in the orchard.

BRIEF DESCRIPTION OF THE DRAWINGS

The drawing is a diagram showing the essential features of the gas fired automatic orchard heating system incorporating the features of this invention.

DESCRIPTION OF THE PREFERRED EMBODIMENT

As an example of one embodiment of this invention there is shown a gas fired automatic orchard heating system comprising a propane gas storage tank 10 at a predetermined fixed remote fuel supply and control station 11. The tank 10 is filled to the proper level 12, 85% to 87% of tank capacity, leaving vapor space 13 above the liquid fuel 14 as gaseous fuel for the vapor gas service. A shut-off valve 15 is opened to allow gas to flow through line 16 to the pressurestat 17, through the bottom section 18 thereof out through line 19 to the pressure regulator 20 and then through line 21 to the manual reset valve 22. As the manual reset valve 22 is normally in closed position until manually opened and then energized through leads 23 and 24 by current generated by the pilot generator 25, the gas goes no further until the manual reset valve 22 is opened manually.

To start the gas fired vaporizer 26, the push button 27 on the manual reset valve 22 is pressed and held down while lighting the pilot generator 25, the push button 27 being held down for about one minute and then released. The pilot generator 25 should now be generating sufficient current through leads 23 and 24 to operate the diaphragm gas valve 28 and also hold open the manual reset valve 22 so long as the pilot flame 29 of pilot generator is burning. The pilot flame 29 is directed so as to ignite the burner 34 and also the burner 31. The vaporizer 26 is now in operation.

If the pressure of the vapor in vapor space 13 decreases below the spring pressure setting in the pressurestat regulator 17 due to too rapid withdrawal of gas from the storage tank 10 or a drop in atmospheric temperature surrounding the storage tank 10, the valve in the pressurestat 17 will open and let gas flow from line 32 to line 33 to the vaporizer burner 34, and heat the bottom of the storage tank 10 thereby vaporizing liquid propane 14 to vapor in space 13 in the tank. So long as the capacity of the vaporizer burner 34 is sufficient to create vapor in excess of the amount of vapor withdrawal, then the pressure in the vapor area 13 will build up to the point where the pressurestat 17 will shut off flow to the burner 34 and the burner flame 35 will go out. By equipping the pressurestat 17 with an appropriate spring, the quantity of gas needed can be supplied at the pressure needed for operation of numerous burning units.

The ambient temperature thermostat 36 is located near the propane storage tank 10 but protected from any source of direct radiant heat such as the sun or generated by the burners 31 and 34. With a drop in ambient atmospheric temperature the thermostat 36 closes interconnecting leads 37 and 38 to close the circuit from the pilot generator 25 to the diaphragm gas valve 28 which allows gas to flow to the burner 31 and through line 39 to the top of the diaphragm 40 of the second stage regulator 41. The burner 31 is ignited by pilot flame 29 and augments burner 34 as a source of heat for vaporization. This gas flow through diaphragm gas valve 28 and line 39 is at a pressure controlled by regulator 20.

If the various orchard heater units 42 are needed, the valve 43 is opened allowing gas to flow from vapor space 13 through line 44 and line 45 through the first stage regulator 46, and then through line 47 and the second stage regulator 41 and lines 48 to the various series of orchard heater units 42 in the areas to be heated. To start the heating units 42 the operator turns the operating handle 49 of the pilot on the gas cock safety valve 50 and hold it open manually while lighting the pilot burner 51. As soon as thermocouple 52 is generating sufficient current to energize and hold the solenoid 53 of valve 50 open, then the operator turns the handle 49 to the on position. The heater units 42 thus lighted are ready for service in case of a temperature drop.

The second stage pressure regulator 41 is spring loaded to furnish gas to the multiple heating units 42 at a pressure sufficient to give a good and stable pilot flame on the pilot burner 51 but not enough pressure to open valve 54. When the thermostat 36 closes with drop in ambient temperature, the diaphragm gas valve 28 lets gas pressure regulated by regulator 20 apply to the top of the diaphragm on the second stage regulator 41 so that the pressure in heater supply lines 48 is raised to the sum of the spring regulated pressure and the gas pressure from regulator 20. This pressure is sufficient to open valve 54 and turn on burner 55 which is ignited by the pilot burner 51.

All of the multiple heating units 42 with the pilots 51 lighted and with the gas cock safety valve handle 49 turned to the on position will now start operating. When the temperature surrounding the thermostat rises, the diaphragm gas valve 28 will close and the pilot flame 29 will burn. Gas pressure in the top diaphragm section 40 of the second stage regulator valve 41 causes gas pressure to the heating units 42 to return to the original spring setting of the second stage regulator valve 41. This allows valve 54 to close and turns off the burner 55. All of the recited valves functioning as described are commercially available and their detailed construction forms no part of this invention.

What I claim is:

1. An orchard heating system comprising in combination:
   (A) a source of gas pressure,
   (B) a plurality of remotely separated orchard heater units each having,
   (C) a pilot burner and,
   (D) a main heating burner,
   (E) a single common supply line interconnected between the source of gas pressure and each of the pilot and heating burners of each heater unit,
   (F) a thermostatically controlled regulator valve in the single common supply line operable to provide a fixed positive high pressure and a fixed positive low pressure in the supply line to the heater unit burners in response to the ambient air temperature in the orchard,
   (G) and a valve (54) for each heater unit connected in the common supply line between the regulator valve and the main heating burner of each heater unit arranged to shut off flow from the common supply line to the main heating burner whenever the regulator valve is positioned to provide the low pressure in the common supply line.

2. An orchard heating system as in claim 1 wherein the valve (54) further by-passes the common supply line flow to the main heating burner whenever the regulator valve is positioned to provide high pressure in the common supply line.

3. An orchard heating system as in claim 1 wherein the pilot burner of each heater unit is at all times connected to the common supply line between the regulator valve and the valve (54) and continues to function irrespective of pressure changes in the common supply line caused by the operation of the regulator valve.

References Cited

UNITED STATES PATENTS 2,139,344  12/1938  Andersen.
3,064,900  11/1962  Ages.

EDWARD J. MICHAEL, Primary Examiner